(12) United States Patent
Chen (10) Patent No.: US 12,046,428 B2
(45) Date of Patent: Jul. 23, 2024

(54) BACKLIGHT KEYBOARD

(71) Applicant: DARFON ELECTRONICS CORP., Taoyuan (TW)

(72) Inventor: Chao-Yu Chen, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 117 days.

(21) Appl. No.: 18/081,702

(22) Filed: Dec. 15, 2022

(65) Prior Publication Data

US 2023/0197374 A1 Jun. 22, 2023

Related U.S. Application Data

(60) Provisional application No. 63/291,470, filed on Dec. 20, 2021.

(30) Foreign Application Priority Data

Nov. 24, 2022 (TW) .................................. 111144932

(51) Int. Cl.
*H01H 13/83* (2006.01)
*F21V 8/00* (2006.01)

(52) U.S. Cl.
CPC .......... *H01H 13/83* (2013.01); *G02B 6/0088* (2013.01); *H01H 2219/058* (2013.01)

(58) Field of Classification Search
CPC ............. H01H 13/83; H01H 2219/062; H01H 2219/039; H01H 13/023; H01H 2219/06; H01H 2221/07; H01H 9/181; H01H 2219/036; H01H 2219/044; H01H 2013/026; H01H 9/16; H01H 2219/0622; H01H 2219/037
See application file for complete search history.

(56) References Cited

U.S. PATENT DOCUMENTS 5,408,060 A * 4/1995 Muurinen ............... H01H 13/83
 200/312
8,339,294 B2 * 12/2012 Frazier ................... G06F 3/0202
 345/169
(Continued)

FOREIGN PATENT DOCUMENTS

CN 106301323 A 1/2017
TW I416565 B 11/2013
(Continued)

*Primary Examiner* — Ahmed M Saeed
(74) *Attorney, Agent, or Firm* — Winston Hsu (57) ABSTRACT

A backlight keyboard includes a first keyswitch, a first backlight source, a light guide plate and a first board having first and second holes. The light guide plate is applied to the backlight keyboard and a second backlight keyboard including a second keyswitch, a second backlight source and a second board having third and fourth holes. The second keyswitch on the second backlight keyboard is shifted transversely relative to the first keyswitch on the backlight keyboard to make the first and fourth holes have a first overlapping area. The light guide plate has a first dot structure corresponding to the first and third holes and a second dot structure corresponding to the second and fourth holes except the first overlapping area for guiding light to symbols on the first and second keyswitches. The first dot structure is less than the second dot structure in dot intensity.

10 Claims, 8 Drawing Sheets

(56) References Cited

U.S. PATENT DOCUMENTS

| | | | | |
|---|---|---|---|---|
| 8,890,014 B1* | 11/2014 | Chen | ................... | G02B 6/0041 |
| | | | | 362/23.03 |
| 9,040,856 B2 | 5/2015 | Chen | | |
| 9,214,301 B2 | 12/2015 | Chen | | |
| 9,384,916 B1* | 7/2016 | Matsuoka | .............. | H01H 13/83 |
| 10,276,327 B2 | 4/2019 | Chen | | |
| 10,586,664 B2 | 3/2020 | Yeh | | |
| 11,515,107 B2* | 11/2022 | Chen | ................... | G06F 1/1662 |
| 2009/0224947 A1* | 9/2009 | Frazier | ................. | G06F 3/0202 |
| | | | | 341/22 |
| 2016/0086746 A1* | 3/2016 | Chen | ................... | H01H 13/83 |
| | | | | 362/23.03 |
| 2018/0082801 A1* | 3/2018 | Lin | ....................... | H01H 13/14 |
| 2018/0122598 A1* | 5/2018 | Kuscher | ................ | H01H 13/83 |
| 2022/0164038 A1* | 5/2022 | Chen | ................... | G06F 3/0238 |
| 2023/0305214 A1* | 9/2023 | Chen | ................... | H01H 13/83 |

FOREIGN PATENT DOCUMENTS

| | | |
|---|---|---|
| TW | M548881 U | 9/2017 |
| TW | 202143270 A | 11/2021 |

* cited by examiner

BACKLIGHT KEYBOARD

CROSS REFERENCE TO RELATED APPLICATIONS

This application claims the benefit of U.S. Provisional Application No. 63/291,470, filed on Dec. 20, 2021. The content of the application is incorporated herein by reference.

BACKGROUND OF THE INVENTION

1. Field of the Invention

The present invention relates to a backlight keyboard, and more specifically, to a backlight keyboard having a light guide plate suitable for different language keyswitch sets.

2. Description of the Prior Art

In general, a backlight module of a backlight keyboard includes a light guide plate and a backlight source. A bottom board of the backlight keyboard is disposed on the light guide plate and has holes respectively corresponding to a plurality of keyswitches of the backlight keyboard, and the light guide plate has a dot structure formed corresponding to each hole for guiding light to pass through each hole and be incident to symbols on the keyswitches, so as to generate the illumination effect. However, since a keyswitch layout on the backlight keyboard could be varied with different language families (e.g., U.S. language family, U.K. language family, Brazil language family, or Japanese language family), a hole configuration on the bottom board and the dot structural design of the corresponding light guide plate could be varied accordingly. As such, it may cause the problem that the light guide plate cannot be commonly applied to the backlight keyboards with different language families, so as to increase the manufacturing cost of the backlight keyboard in the light guide plate design.

SUMMARY OF THE INVENTION

The present invention provides a backlight keyboard including a first language keyswitch set, a first board, a first backlight source, and a light guide plate. The first language keyswitch set includes at least one first keyswitch having a first size. The first board is disposed under the first language keyswitch set. The first board has a first hole configuration corresponding to the first keyswitch. The first hole configuration includes a first hole and a second hole opposite to each other. The first backlight source is disposed under the first board for providing light. The light guide plate is applied to the backlight keyboard and a second backlight keyboard. The second backlight keyboard includes a second language keyswitch set, a second board, and a second backlight source. The second language keyswitch set includes at least one second keyswitch having a second size less than the first size. The second board is disposed under the second language keyswitch set. The second board has a second hole configuration corresponding to the second keyswitch. The second hole configuration includes a third hole and a fourth hole opposite to each other. The second backlight source is disposed under the second board for providing light. The second keyswitch on the second backlight keyboard is shifted transversely relative to the first keyswitch on the backlight keyboard to make the first hole and the fourth hole have a first overlapping area. The light guide plate is disposed under the first board or the second board. The light guide plate has a first dot structure formed corresponding to the first hole and the third hole and has a second dot structure formed at least partially corresponding to the second hole and the fourth hole at least except the first overlapping area, for guiding light to symbols on the first keyswitch and the second keyswitch. The first dot structure is less than the second dot structure in dot intensity.

The present invention further provides a backlight keyboard including a first language keyswitch set, a first board, a first backlight source, and a light guide plate. The first language keyswitch set includes at least one first keyswitch. The first board is disposed under the first language keyswitch set. The first board has a hole configuration corresponding to the first keyswitch. The hole configuration includes at least one first hole, at least one second hole and at least one third hole. The first hole is opposite to the second hole, and the third hole is formed inward relative to the second hole. The first backlight source is disposed under the first board for providing light. The light guide plate is applied to the backlight keyboard and a second backlight keyboard. The second backlight keyboard includes a second language keyswitch set, a second board, and a second backlight source. The second language keyswitch set includes at least one second keyswitch having the same size with the first keyswitch. The second board is disposed under the second language keyswitch set. The second board has the hole configuration corresponding to the second keyswitch. The second backlight source is disposed under the second board for providing light. The second keyswitch on the second backlight keyboard is shifted transversely relative to the first keyswitch on the backlight keyboard to make the second hole corresponding to the second keyswitch and the third hole corresponding to the first keyswitch have a first overlapping area and make the third hole corresponding to the second keyswitch and the second hole corresponding to the first keyswitch have a second overlapping area. The light guide plate is disposed under the first board or the second board. The light guide plate has a first dot structure formed corresponding to the first hole, a second dot structure formed corresponding to the second hole, and a third dot structure formed at least partially corresponding to the third hole except the first overlapping area and the second overlapping area, for guiding light to symbols on the first keyswitch and the second keyswitch. The third dot structure is larger than the first dot structure and less than the second dot structure in dot intensity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
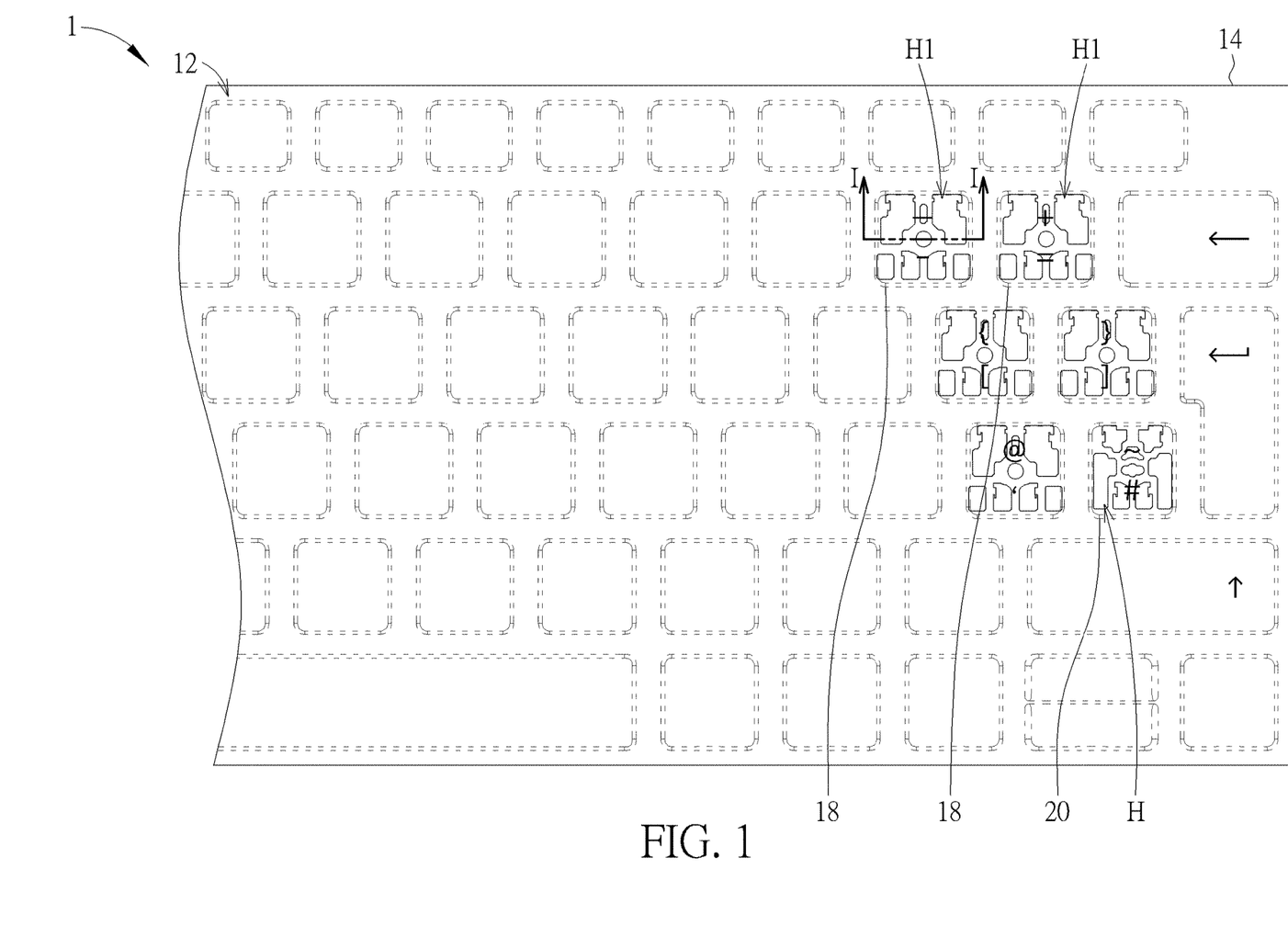
FIG. 1 is a partial enlarged top view of a first backlight keyboard according to an embodiment of the present invention.
Figure 2:
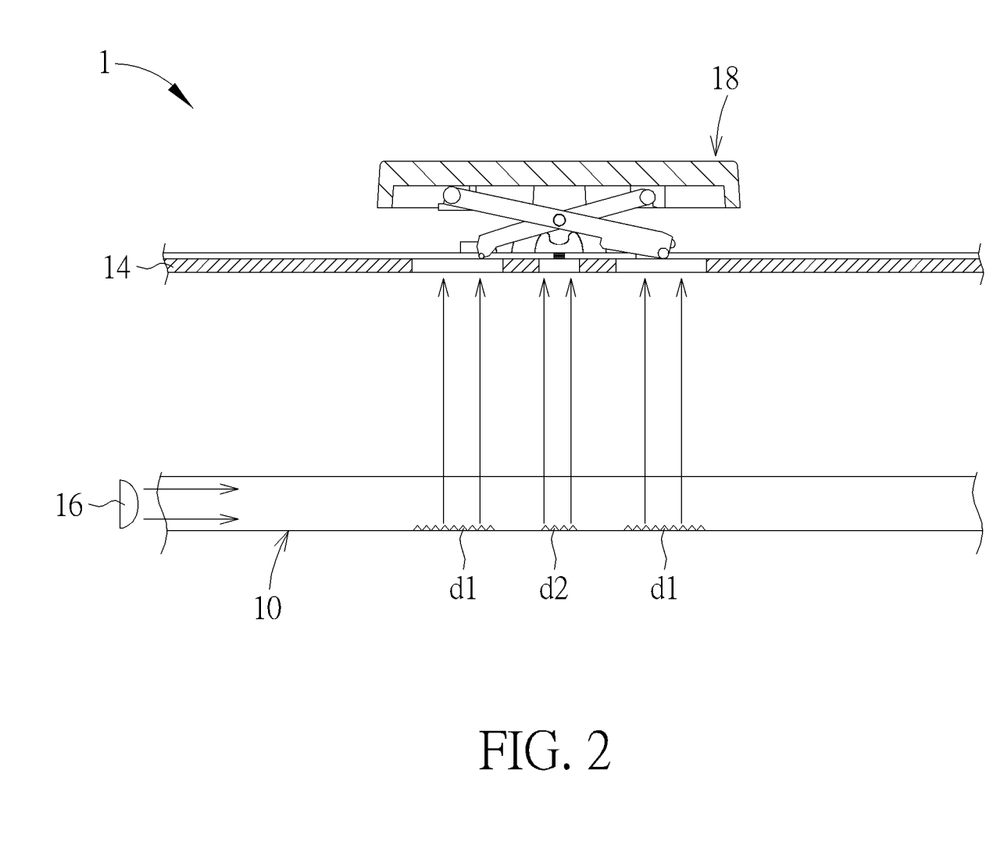
FIG. 2 is an exploded cross-sectional diagram of the first backlight keyboard in FIG. 1 along a cross-sectional line I-I.
Figure 3:
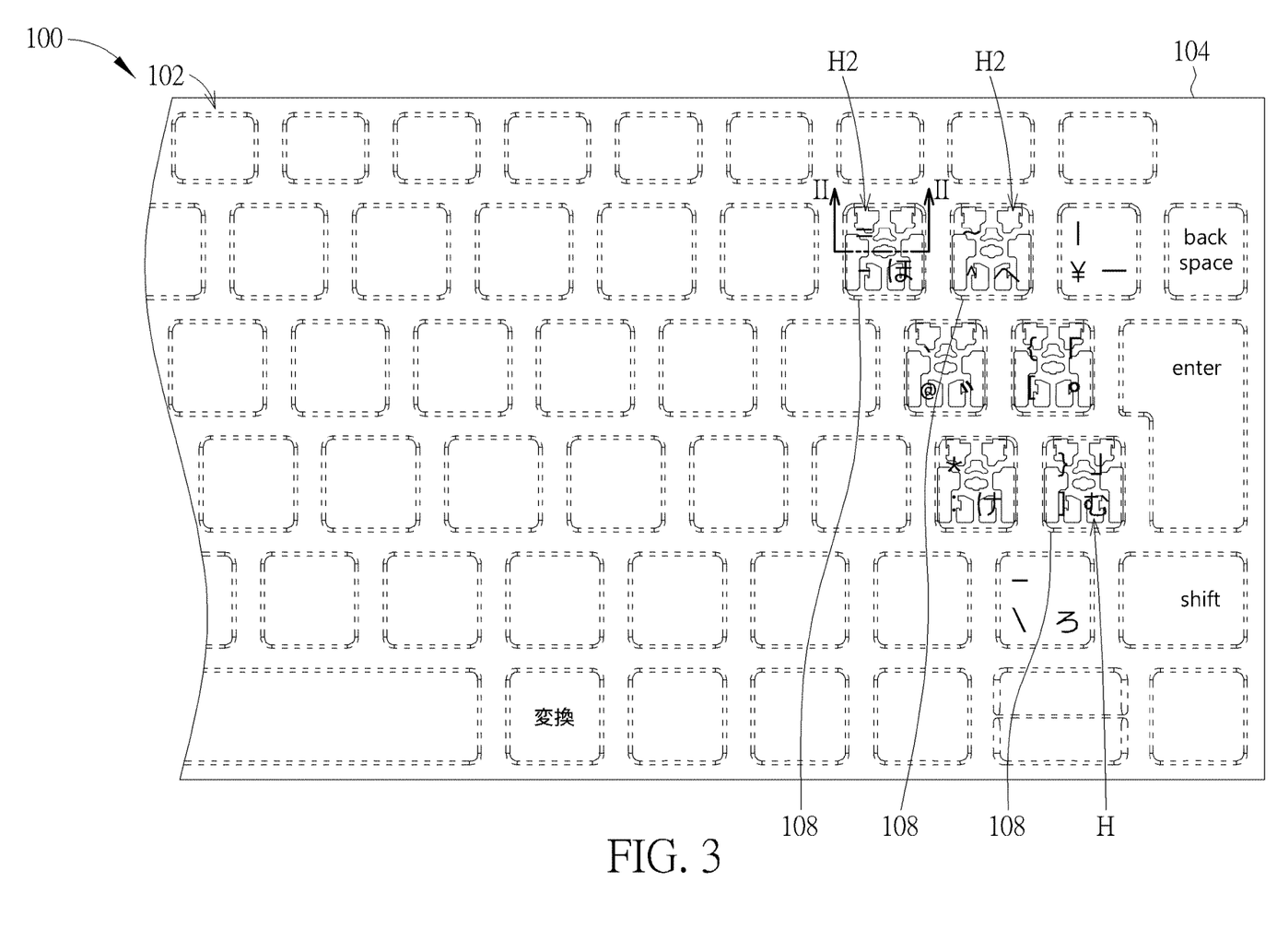
FIG. 3 is a partial enlarged top view of a second backlight keyboard according to an embodiment of the present invention.
Figure 4:
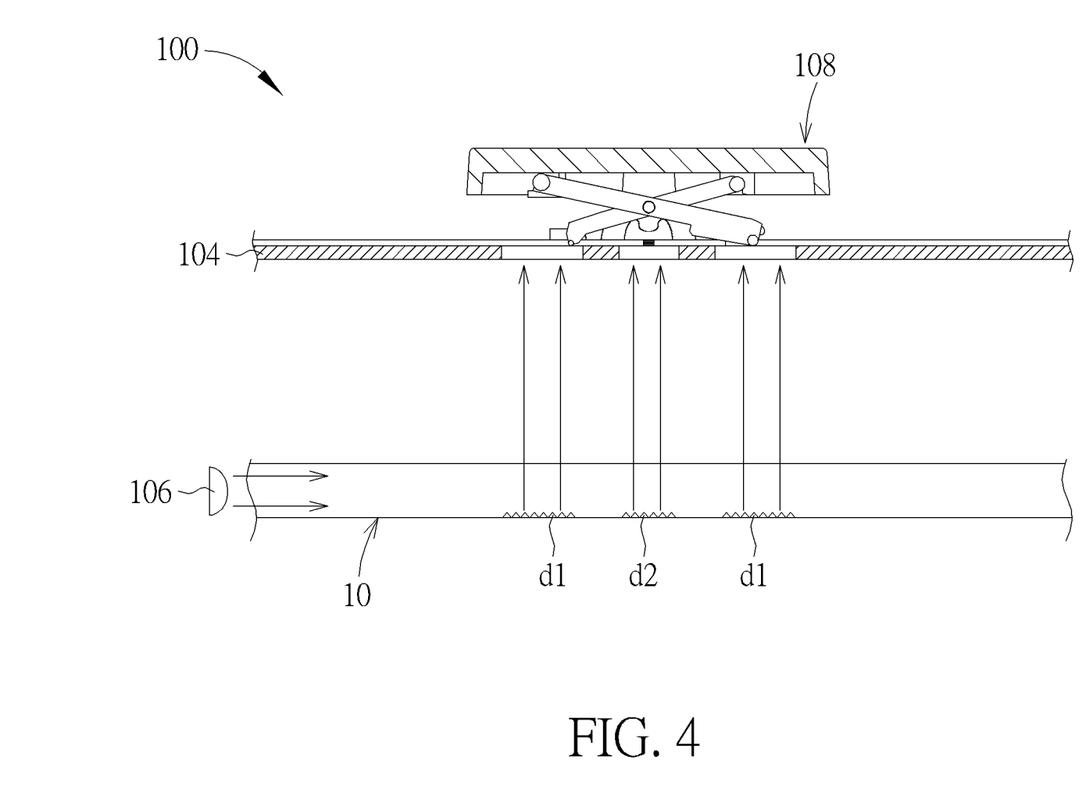
FIG. 4 is an exploded cross-sectional diagram of the second backlight keyboard in FIG. 3 along a cross-sectional line II-II.

Please refer to FIGS. 1-4. FIG. 1 is a partial enlarged top view of a first backlight keyboard 1 according to an embodiment of the present invention. FIG. 2 is an exploded cross-sectional diagram of the first backlight keyboard 1 in FIG. 1 along a cross-sectional line I-I. FIG. 3 is a partial enlarged top view of a second backlight keyboard 100 according to an embodiment of the present invention. FIG. 4 is an exploded cross-sectional diagram of the second backlight keyboard 100 in FIG. 3 along a cross-sectional line II-II. For clearly showing position relationships of holes and keyswitches of the first backlight keyboard 1 and the second backlight keyboard 100, a first language keyswitch set 12 is briefly depicted by dotted lines in FIG. 1, and a second language keyswitch set 102 is briefly depicted by dotted lines in FIG. 3.

As shown in FIGS. 1-4, a light guide plate 10 is suitable for light guidance of the first backlight keyboard 1 and the second backlight keyboard 100. The first backlight keyboard 1 includes the light guide plate 10, the first language keyswitch set 12, a first board 14, and a first backlight source 16 (preferably a light emitting diode, but not limited thereto). The first language keyswitch set 12 includes first keyswitches 18 and 20 with different sizes (five first keyswitches 18 having a 1.0X keyswitch size and one keyswitch 20 having a 0.88X keyswitch size shown in FIG. 1, but not limited thereto). The first board 14 is disposed under the first language keyswitch set 12, and the first backlight source 16 is disposed under the first board 14 to provide light for illuminating symbols on the first language keyswitch set 12. The second backlight keyboard 100 includes the second language keyswitch set 102, a second board 104, and a second backlight source 106 (preferably a light emitting diode, but not limited thereto). The second language keyswitch set 102 includes at least one keyswitches 108 with the same size (six second keyswitches 108 shown in FIG. 3, but not limited thereto). The second board 104 is disposed under the second language keyswitch set 102, and the second backlight source 106 is disposed under the second board 104 to provide light for illuminating symbols on the second language keyswitch set 102. In such a manner, as shown in FIG. 2 and FIG. 4, light generated by the first backlight source 16 can pass through the first board 14 to be incident to the first language keyswitch set 12 via the design in which the light guide plate 10 is disposed under the first board 14, and light generated by the second backlight source 106 can pass through the second board 104 to be incident to the second language keyswitch set 102 via the design in which the light guide plate 10 is disposed under the second board 104, so as to illuminate the symbols on upper surfaces of the first language keyswitch set 12 and the second language keyswitch set 102.

Figure 5:
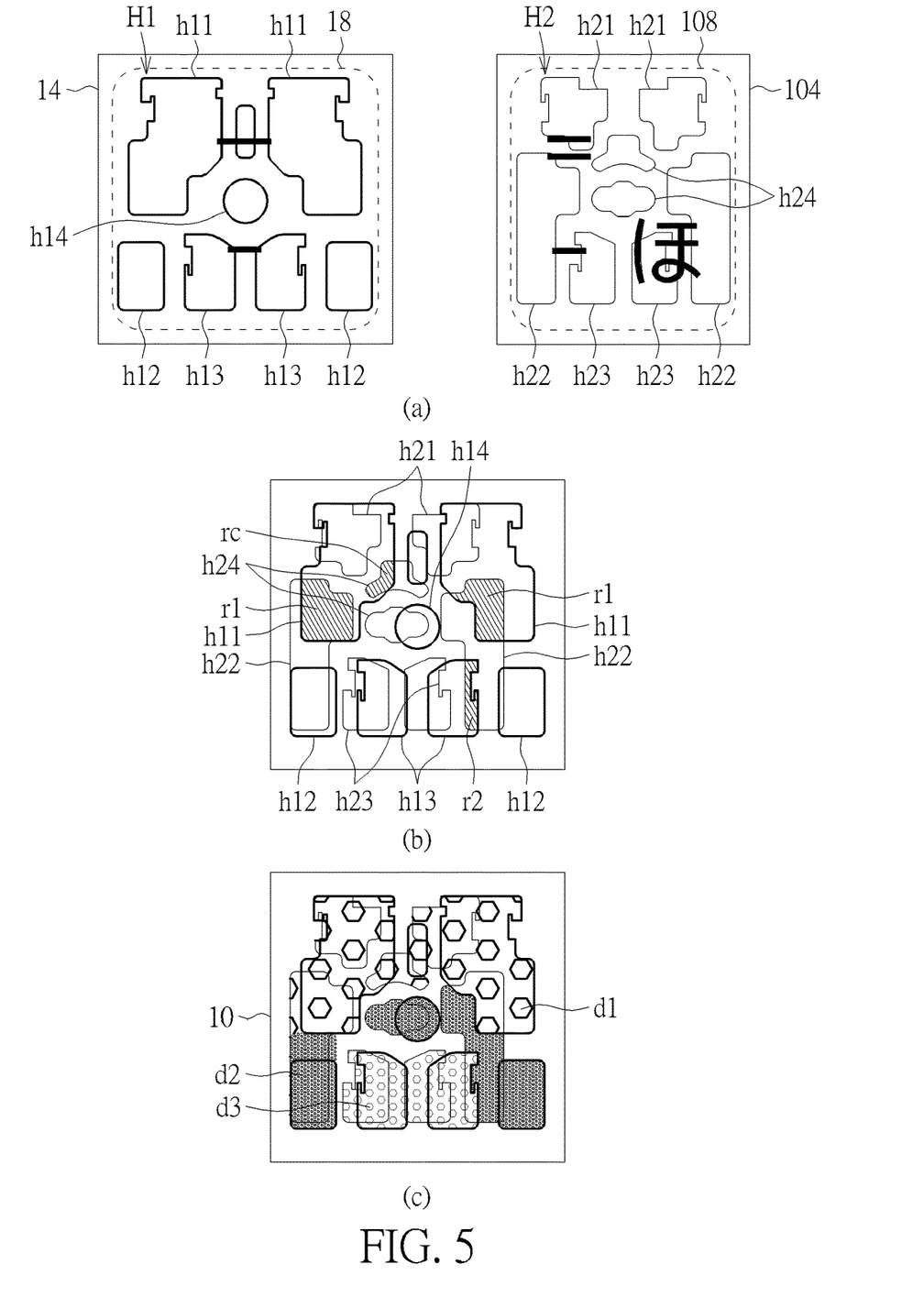
FIG. 5 is a hole overlapping diagram of a first hole configuration of a first board in FIG. 1 corresponding to a first keyswitch and a second hole configuration of a second board in FIG. 3 corresponding to a second keyswitch.

More detailed description for the dot structural design of the light guide plate 10 in the embodiment that the first language keyswitch set 12 corresponds to U.K. language family and the second language keyswitch set 102 corresponds to Japanese language family is provided as follows. Please refer to FIG. 1, FIG. 3 and FIG. 5. FIG. 5 is a hole overlapping diagram of a first hole configuration H1 of the first board 14 in FIG. 1 corresponding to the first keyswitch 18 and a second hole configuration H2 of the second board 104 in FIG. 3 corresponding to the second keyswitch 108. For clearly showing position relationships of the holes and the keyswitches of the first backlight keyboard 1and the second backlight keyboard 100, the first keyswitch 18 and the second keyswitch 108 are briefly depicted by dotted lines in (a) of FIG. 5, and symbols on upper surfaces of the first keyswitch 18 and the second keyswitch 108 are briefly depicted by bold lines in (a) of FIG. 5.

As shown in FIG. 1, FIG. 3 and (a) of FIG. 5, the first keyswitch 18 of the first language keyswitch set 12 could be a 1.0X sized keyswitch (could be regarded as the first keyswitch 18 having a first size, such as the first keyswitch 18 having symbols "_" and "−" formed thereon as shown in FIG. 1 and (a) of FIG. 5). The second keyswitch 108 of the second language keyswitch set 102 could be a 0.88X sized keyswitch (could be regarded as the second keyswitch having a second size, such as the second keyswitch 108 having symbols "=" and "−" formed thereon as shown in FIG. 3 and (a) of FIG. 5). The first board 14 has the first hole configuration H1 corresponding to the first keyswitch 18, and the first hole configuration H1 includes a first hole h11 and a second hole h12 opposite to each other. The second board 104 has the second hole configuration H2 corresponding to the second keyswitch 108, and the second hole configuration H2 includes a third hole h21 and a hole h22 opposite to each other.

As shown in FIG. 1, FIG. 3 and (b), (c) of FIG. 5, the second keyswitch 108 on the second backlight keyboard 100 is shifted transversely relative to the first keyswitch 18 on the first backlight keyboard 1 to make the first hole h11 and the fourth hole h22 have a first overlapping area r1. In this embodiment, as shown in (c) of FIG. 5, the light guide plate 10 has a first dot structure d1 (preferably formed by micro-prisms or a dot printing process, but not limited thereto) corresponding to the first hole h11 and the third hole h21, and has a second dot structure d2 (preferably formed by micro-prisms or a dot printing process, but not limited thereto) corresponding to the second hole h12 and the fourth hole h22 at least except the first overlapping area r1, wherein the first dot structure d1 is less than the second dot structure d2 in dot density. That is, the first dot structure d1 with a lower dot density is formed on the light guide plate 10 corresponding to the first overlapping area r1 within the first hole h11 (in the practical application, as shown in (c) of FIG. 5, the first dot structure d1 could be further formed on the light guide plate 10 corresponding to an area adjacent to the first overlapping area r1 within the fourth hole h22, but not limited thereto), so as to prevent the overbrightness problem from occurring at positions of the first keyswitch 18 and the second keyswitch 108 corresponding to the first overlapping area r1. In such a manner, no matter the light guide plate 10 is disposed in the first backlight keyboard 1 having the first language keyswitch set 12 or the second backlight keyboard 100 having the second language keyswitch set 102, light emitted from the first backlight source 16 and the second backlight source 106 can be incident to the first keyswitch 18 corresponding to the first hole h11 and the second hole h12 and the second keyswitch 108 corresponding to the third hole h21 and the fourth hole h22 more evenly, so as to achieve the uniform illumination effect for the corresponding symbols on the first keyswitch 18 and the second keyswitch 108.

In the practical application, as shown in (a), (b) of FIG. 5, the first hole configuration H1 could further include a fifth hole h13 formed inward relative to the second hole h12, and the second hole configuration H2 could further include a sixth hole h23 formed inward relative to the fourth hole h22. The second keyswitch 108 on the second backlight keyboard 100 is shifted transversely relative to the first keyswitch 18 on the first backlight keyboard 1 to make the fourth hole h22 and the fifth hole h13 have a second overlapping area r2. The light guide plate 10 could have a third dot structure d3 (preferably formed by micro-prisms or a dot printing process, but not limited thereto) corresponding to the fifth hole h13 and the sixth hole h23, and have the second dot structure d2 at least partially corresponding to the fourth hole h22 except the first overlapping area r1 and the second overlapping area r2, wherein the third dot structure d3 is larger than the first dot structure d1 and less than the second dot structure d2 in dot density. That is, the third dot structure d3 less than the second dot structure d2 in dot density is formed on the light guide plate 10 corresponding to the second overlapping area r2, so as to prevent the overbrightness problem from occurring at positions of the first keyswitch 18 and the second keyswitch 108 corresponding to the second overlapping area r2. In such a manner, light emitted from the first backlight source 16 and the second backlight source 106 can be incident to the first keyswitch 18 corresponding to the fifth hole h13 and the second keyswitch 108 corresponding to the sixth hole h23 more evenly, so as to achieve the uniform illumination effect for the corresponding symbols on the first keyswitch 18 and the second keyswitch 108.

Furthermore, as shown in (a), (b) of FIG. 5, the first hole configuration H1 could further include a first central hole h14, and the second hole configuration H2 could further include a second central hole h24. The second keyswitch 108 on the second backlight keyboard 100 is shifted transversely relative to the first keyswitch 18 on the first backlight keyboard 1 to make the second central hole h24 and the first hole h11 have a central overlapping area rc. The light guide plate 10 could have the second dot structure d2 at least partially corresponding to the first central hole h14 and the second central hole h24 except the central overlapping area rc (in the practical application, as shown in (c) of FIG. 5, the first dot structure d1 could be further formed on the light guide plate 10 corresponding to an area adjacent to the central overlapping area rc within the second central hole h24, but not limited thereto). That is, the first dot structure d1 with the lower dot density is formed on the light guide plate 10 corresponding to the central overlapping area rc within the first hole h11, so as to prevent the overbrightness problem from occurring at positions of the first keyswitch 18 and the second keyswitch 108 corresponding to the central overlapping area rc. In such a manner, light emitted from the first backlight source 16 and the second backlight source 106 can be incident to the first keyswitch 18 corresponding to the first central hole h14 and the second keyswitch 108 corresponding to the second central hole h24 more evenly, so as to achieve the uniform illumination effect for the corresponding symbols on the first keyswitch 18 and the second keyswitch 108.

Figure 6:
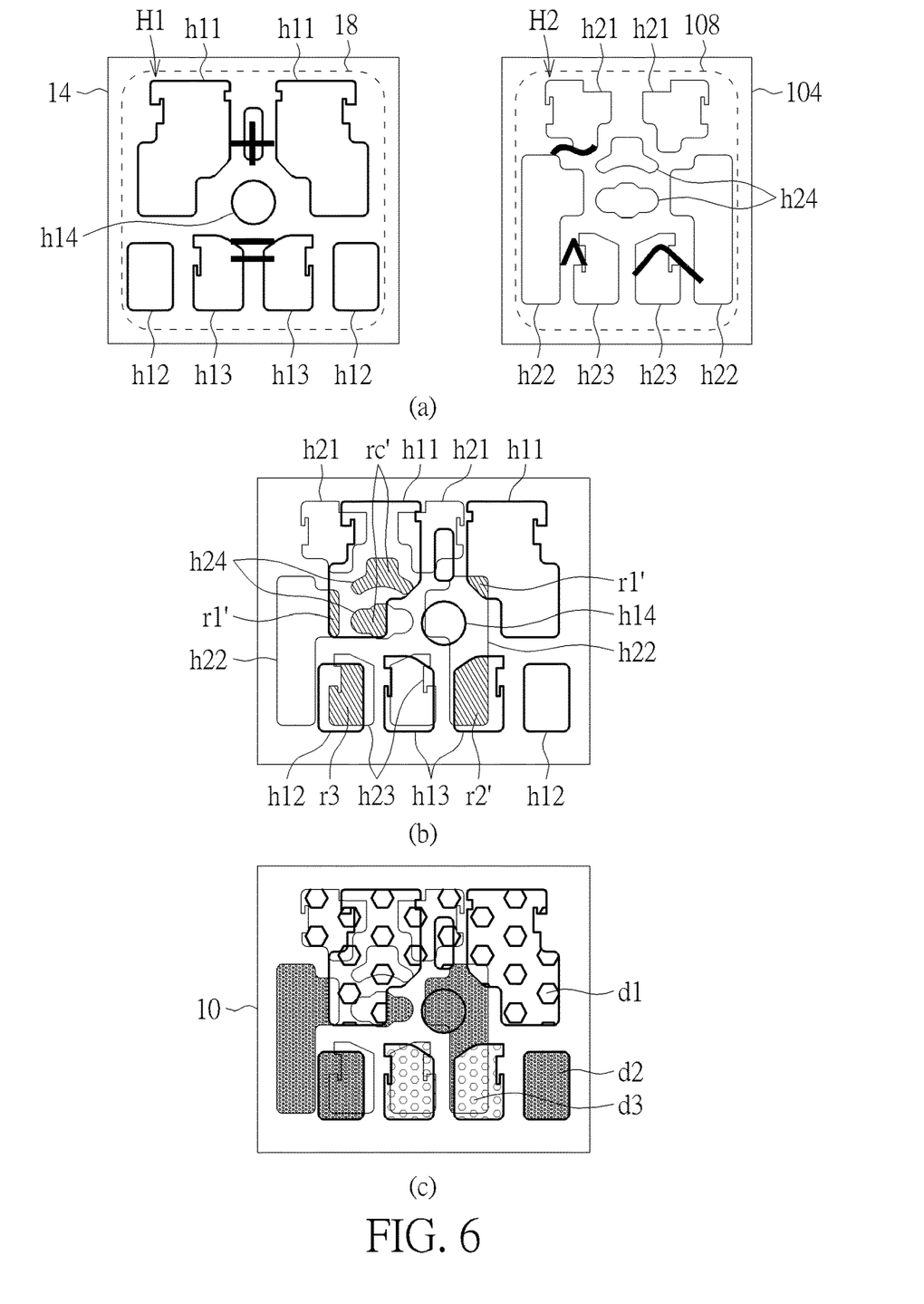
FIG. 6 is a hole overlapping diagram of the first hole configuration of the first board in FIG. 1 corresponding to the first keyswitch and the second hole configuration of the second board in FIG. 3 corresponding to the second keyswitch.

To be noted, the dot structural design of the light guide plate 10 could be varied with different lateral offsets of the second keyswitch 108 on the second backlight keyboard 100 relative to the first keyswitch 18 on the first backlight keyboard 1. In brief, please refer to FIG. 1, FIG. 3 and FIG. 6. FIG. 6 is a hole overlapping diagram of the first hole configuration H1 of the first board 14 in FIG. 1 corresponding to the first keyswitch 18 and the second hole configuration H2 of the second board 104 in FIG. 3 corresponding to the second keyswitch 108. For clearly showing position relationships of the holes and the keyswitches of the first backlight keyboard 1 and the second backlight keyboard 100, the first keyswitch 18 and the second keyswitch 108 are briefly depicted by dotted lines in (a) of FIG. 6, and symbols on upper surfaces of the first keyswitch 18 and the second keyswitch 108 are briefly depicted by bold lines in (a) of FIG. 6.

As shown in FIG. 1, FIG. 3 and (a), (b) of FIG. 6, the first keyswitch 18 of the first language keyswitch set 12 could be a 1.0X sized keyswitch (e.g., the first keyswitch 18 having symbols "+" and "=" formed thereon as shown in FIG. 1 and (a) of FIG. 6). The second keyswitch 108 of the second language keyswitch set 102 could be a 0.88X sized keyswitch (e.g., the second keyswitch 108 having symbols "~" and "`" formed thereon as shown in FIG. 3 and (a) of FIG. 6). The second keyswitch 108 on the second backlight keyboard 100 is shifted transversely relative to the first keyswitch 18 on the first backlight keyboard 1 to make the fourth hole h22 and the first hole h11 have a first overlapping area r1'. The light guide plate 10 has the first dot structure d1 corresponding to the first hole h11 and the third hole h21, and has the second dot structure d2 corresponding to the second hole h12 and the fourth hole h22 at least except the first overlapping area r1' (as shown in (c) of FIG. 6). That is, the first dot structure d1 with the lower dot density is formed on the light guide plate 10 corresponding to the first overlapping area r1' within the first hole h11, so as to prevent the overbrightness problem from occurring at positions of the first keyswitch 18 and the second keyswitch 108 corresponding to the first overlapping area r1'.

Furthermore, as shown in (b) of FIG. 6, the fourth hole h22 and the fifth hole h13 could have a second overlapping area r2', the sixth hole h23 and the second hole h12 could have a third overlapping area r3, and the second central hole h24 and the first hole h11 could have a central overlapping area rc'. In this embodiment, the light guide plate 10 could have the second dot structure d2 formed corresponding to the second hole h12 and the fourth hole h22 except the first overlapping area r1' and the second overlapping area r2', and the light guide plate 10 could have the second dot structure d2 formed corresponding to the first central hole h14 and the second central hole h24 except the central overlapping area rc'. That is, the third dot structure d3 less than the second dot structure d2 in dot density is formed on the light guide plate 10 corresponding to the second overlapping area r2', and the first dot structure d1 with the lower dot density is formed on the light guide plate 10 corresponding to the central overlapping area rc' within the first hole h11, so as to prevent the overbrightness problem from occurring at positions of the first keyswitch 18 and the second keyswitch 108 corresponding to the second overlapping area r2' and the central overlapping area rc'.

Moreover, the light guide plate 10 could have the third dot structure d3 formed at least corresponding to the fifth hole h13 and the sixth hole h23 except the third overlapping area r3. To be more specific, in the practical application, as shown in (c) of FIG. 6, the light guide plate 10 could have the second dot structure d2 formed corresponding to the third overlapping area r3 and have no dot structure formed corresponding to an area adjacent to the third overlapping area r3 within the sixth hole h23, so as to prevent the overbrightness problem from occurring at a position of the second keyswitch 108 corresponding to the sixth hole h23.

In the aforesaid keyswitch shifting configuration as shown in (b) of FIG. 6, no matter the light guide plate 10 is disposed in the first backlight keyboard 1 having the first language keyswitch set 12 or the second backlight keyboard 100 having the second language keyswitch set 102, light emitted from the first backlight source 16 and the second backlight source 106 can be incident to the first keyswitch 18 corresponding to the first hole configuration H1 and the second keyswitch 108 corresponding to the second hole configuration H2 more evenly, so as to achieve the uniform illumination effect for the corresponding symbols on the first keyswitch 18 and the second keyswitch 108.

Figure 7:
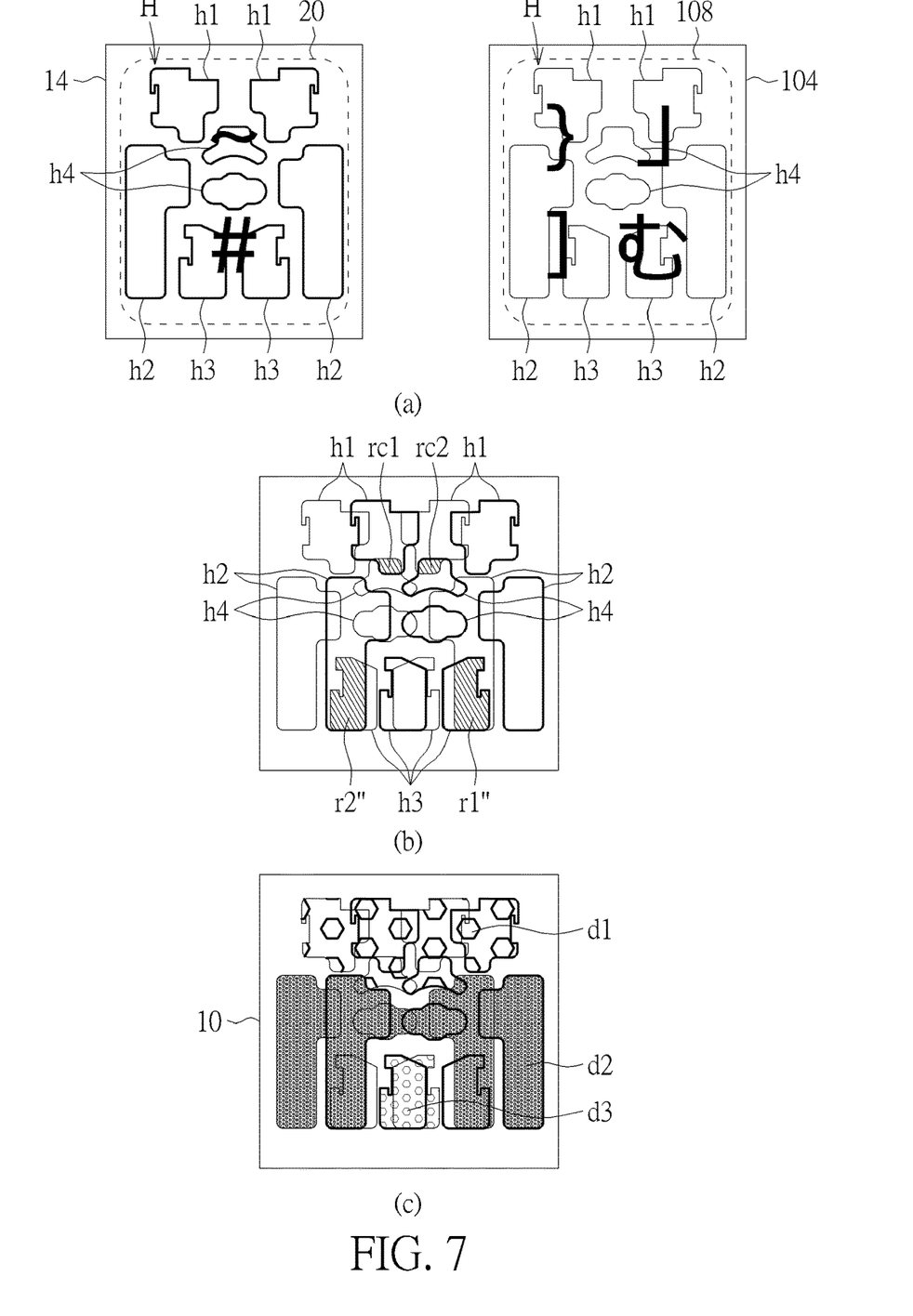
FIG. 7 is a hole overlapping diagram of a hole configuration of the first board in FIG. 1 corresponding to the first keyswitch and the hole configuration of the second board in FIG. 3 corresponding to the second keyswitch.

The corresponding dot structural design of the light guide plate 10 is also different in the configuration that the second keyswitch 108 on the second backlight keyboard 100 is transversely shifted relative to the first keyswitch 20 on the first backlight keyboard 1. In brief, please refer to FIG. 1, FIG. 3 and FIG. 7. FIG. 7 is a hole overlapping diagram of a hole configuration H of the first board 14 in FIG. 1 corresponding to the first keyswitch 20 and the hole configuration H of the second board 104 in FIG. 3 corresponding to the second keyswitch 108. For clearly showing position relationships of the holes and the keyswitches of the first backlight keyboard land the second backlight keyboard 100, the first keyswitch 20 and the second keyswitch 108 are briefly depicted by dotted lines in (a) of FIG. 7, and symbols on upper surfaces of the first keyswitch 20 and the second keyswitch 108 are briefly depicted by bold lines in (a) of FIG. 7.

As shown in FIG. 1, FIG. 3 and (a), (b) of FIG. 7, the first keyswitch 20 of the first language keyswitch set 12 could be a 0.88X sized keyswitch (e.g., the first keyswitch 20 having symbols "~" and "#" formed thereon as shown in FIG. 1 and (a) of FIG. 7). The second keyswitch 108 of the second language keyswitch set 102 could be a 0.88X sized keyswitch (e.g., the second keyswitch 108 having symbols "}" and "]" formed thereon as shown in FIG. 3 and (a) of FIG. 7). The first board 14 has the hole configuration H formed thereon corresponding to the first keyswitch 20, and the second board 104 has the hole configuration H formed thereon corresponding to the second keyswitch 108. The hole configuration H includes at least one first hole h1 and at least one second hole h2 opposite to each other and at least one third hole h3 formed inward relative to the second hole h2. In this embodiment, there are two first holes h1, two second holes h2, and two third holes h3 in the hole configuration H as shown in (a) of FIG. 7, but not limited thereto. The second keyswitch 108 on the second backlight keyboard 100 is shifted transversely relative to the first keyswitch 20 on the first backlight keyboard 1 to make the second hole h2 corresponding to the second keyswitch 108 and the third hole h3 corresponding to the first keyswitch 20 have a first overlapping area r1" and make the third hole h3 corresponding to the second keyswitch 108 and the second hole h2 corresponding to the first keyswitch 20 have a second overlapping area r2". The light guide plate 10 has the first dot structure d1 formed corresponding to the first hole h1, the second dot structure d2 formed corresponding to the second hole h2, and the third dot structure d3 at least partially corresponding to the third hole h3 except the first overlapping area r1" and the second overlapping area r2". To be more specific, in the practical application, as shown in (c) of FIG. 7, the light guide plate 10 could have the second dot structure d2 formed corresponding to the first overlapping structure r1" and the second overlapping structure r2" and have no dot structure formed corresponding to areas adjacent to the first overlapping structure r1" and the second overlapping structure r2" within the third hole h3, so as to prevent the overbrightness problem from occurring at positions of the first keyswitch 20 and the second keyswitch 108 corresponding to the third hole h3.

Furthermore, the hole configuration H could further include at least one central hole h4 (two shown in (b) of FIG. 7, but not limited thereto). In the aforesaid configuration that the second keyswitch 108 on the second backlight keyboard 100 is transversely shifted relative to the first keyswitch 20 on the first backlight keyboard 1, the central hole h4 corresponding to the second keyswitch 108 and the first hole h1 corresponding to the first keyswitch 20 have a first central overlapping area rc1, and the first hole h1 corresponding to the second keyswitch 108 and the central hole h4 corresponding to the first keyswitch 20 have a second central overlapping area rc2. The light guide plate 10 has the second dot structure d2 formed at least partially corresponding to the central holes h4 except the first central overlapping area rc1 and the second overlapping area rc2. That is, the first dot structure d1 with the lower dot density is formed on the light guide plate 10 corresponding to the first central overlapping area rc1 and the second central overlapping area rc2 within the first holes h1 (in the practical application, as shown in (c) of FIG. 7, the first dot structure d1 could be further formed on the light guide plate 10 corresponding to areas adjacent to the first central overlapping area rc1 and the second central overlapping area rc2 within the central holes h4, but not limited thereto), so as to prevent the overbrightness problem from occurring at positions of the first keyswitch 20 and the second keyswitch 108 corresponding to the first central overlapping area rc1 and the second central overlapping area rc2.

In the aforesaid keyswitch shifting configuration as shown in (b) of FIG. 7, no matter the light guide plate 10 is disposed in the first backlight keyboard 1 having the first language keyswitch set 12 or the second backlight keyboard 100 having the second language keyswitch set 102, light emitted from the first backlight source 16 and the second backlight source 106 can be incident to the first keyswitch 20 corresponding to the hole configuration H and the second keyswitch 108 corresponding to the hole configuration H more evenly, so as to achieve the uniform illumination effect for the corresponding symbols on the first keyswitch 20 and the second keyswitch 108.

In summary, no matter the light guide plate 10 is disposed in the first backlight keyboard 1 having the first language keyswitch set 12 or the second backlight keyboard 100 having the second language keyswitch set 102, light emitted from the first backlight source 16 and the second backlight source 106 can be incident to the first language keyswitch set 12 and the second language keyswitch set 102 more evenly, so as to achieve the uniform illumination effect for the corresponding symbols on the first keyswitch 18, the first keyswitch 20, and the second keyswitch 108. In such a manner, even in the configuration that the keyswitches in different language keyswitch sets have different sizes and are transversely shifted relative to each other, the present invention can still generate the effect that the light guide plate can be suitable for light guidance of the backlight keyboards with different language families. Thus, the present invention can solve the prior art problem that the light guide plate cannot be commonly applied to the backlight keyboards with different language families, so as to reduce the manufacturing cost of the backlight keyboard in the light guide plate design.

Figure 8:
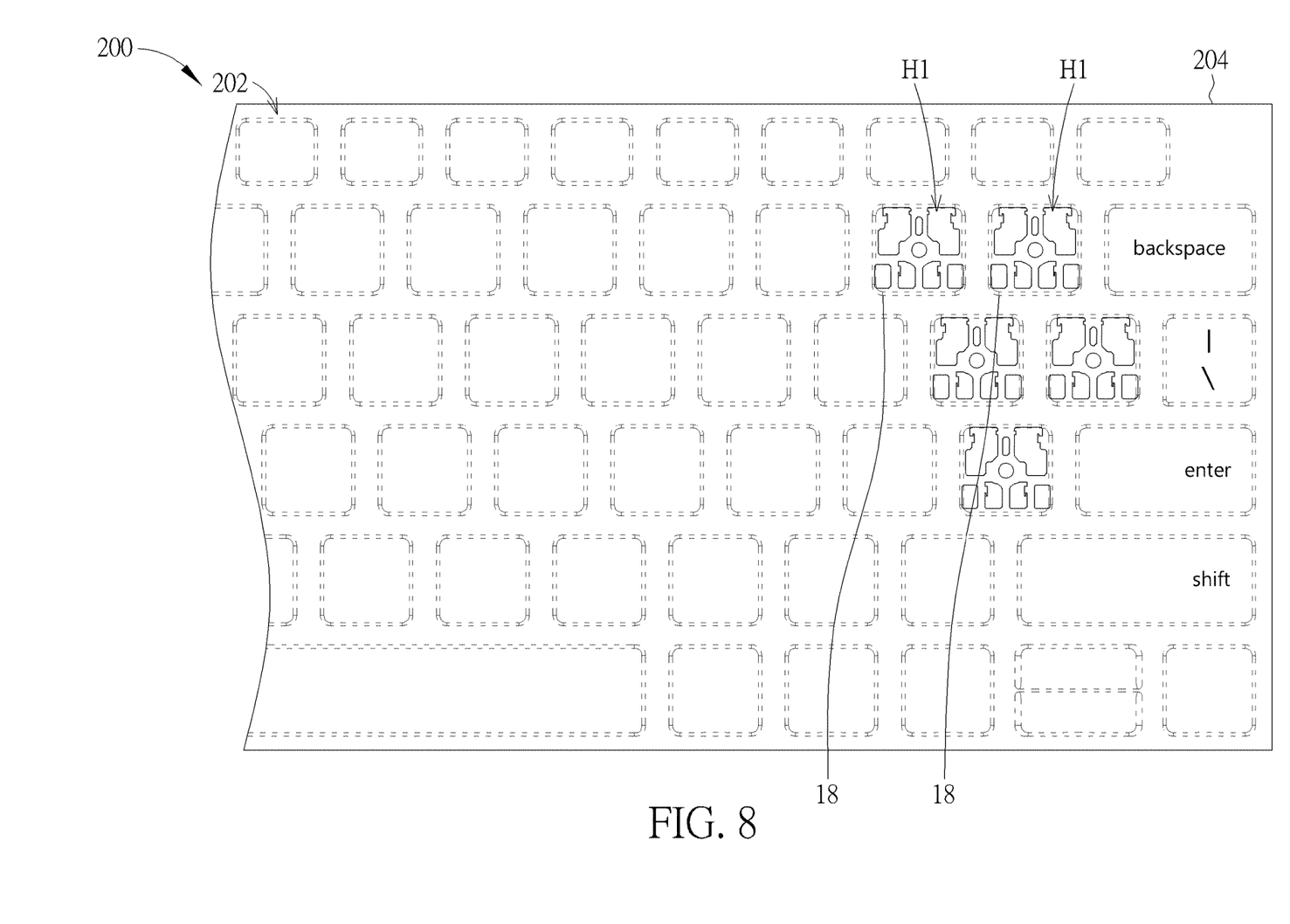
FIG. 8 is a partial enlarged top view of a third backlight keyboard according to an embodiment of the present invention.

Moreover, the dot structural design of the light guide plate 10 provided by the present invention can be applied to a third backlight keyboard 200. Please refer to FIG. 1 and FIG. 8. FIG. 8 is a partial enlarged top view of the third backlight keyboard 200 according to an embodiment of the present invention. For clearly showing position relationships of holes and keyswitches of the third backlight keyboard 200, a third language keyswitch set 202 is briefly depicted by dotted lines in FIG. 8. As shown in FIG. 1 and FIG. 8, the third backlight keyboard 200 includes the third language keyswitch set 202, a third board 204, and a third backlight source (not shown in the figures, which could be preferably a light emitting diode, but not limited thereto). In this embodiment, the third language keyswitch set 202 could preferably correspond to U.S. language family. As known from comparison of FIG. 1 and FIG. 8, the third language keyswitch set 202 is similar to the first language keyswitch set 12 in the 1.0X-sized-keyswitch configuration, meaning that the third language keyswitch set 202 also includes the five keyswitches 18 having the 1.0X keyswitch size in the same arrangement. Thus, the light guide plate 10 can be also suitable for light guidance of the third backlight keyboard 200. That is, the present invention can further generate the effect that the light guide plate 10 can be commonly applied to light guidance of the first backlight keyboard 1, the second backlight keyboard 100 and the third backlight keyboard 200, so as to efficiently the prior art problem that the light guide plate cannot be commonly applied to the backlight keyboards with different language families, so as to reduce the manufacturing cost of the backlight keyboard in the light guide plate design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight keyboard comprising:
a first language keyswitch set comprising at least one first keyswitch having a first size;
a first board disposed under the first language keyswitch set, the first board having a first hole configuration corresponding to the first keyswitch, the first hole configuration comprising a first hole and a second hole opposite to each other;
a first backlight source disposed under the first board for providing light; and
a light guide plate applied to the backlight keyboard and a second backlight keyboard, the second backlight keyboard comprising a second language keyswitch set, a second board, and a second backlight source, the second language keyswitch set comprising at least one second keyswitch having a second size less than the first size, the second board being disposed under the second language keyswitch set, the second board having a second hole configuration corresponding to the second keyswitch, the second hole configuration comprising a third hole and a fourth hole opposite to each other, the second backlight source being disposed under the second board for providing light, the second keyswitch on the second backlight keyboard being shifted transversely relative to the first keyswitch on the backlight keyboard to make the first hole and the fourth hole have a first overlapping area, the light guide plate being disposed under the first board or the second board, and the light guide plate having a first dot structure formed corresponding to the first hole and the third hole and having a second dot structure formed at least partially corresponding to the second hole and the fourth hole at least except the first overlapping area, for guiding light to symbols on the first keyswitch and the second keyswitch;
wherein the first dot structure is less than the second dot structure in dot intensity.

2. The backlight keyboard of claim 1, wherein the first language keyswitch set is a keyswitch set corresponding to United Kingdom language family or United States language family, and the second language keyswitch set is a keyswitch set corresponding to Japanese language family.

3. The backlight keyboard of claim 1, wherein the first hole configuration further comprises a fifth hole formed inward relative to the second hole, the second hole configuration further comprises a sixth hole formed inward relative to the fourth hole, the second keyswitch on the second backlight keyboard is shifted transversely relative to the first keyswitch on the backlight keyboard to make the fourth hole and the fifth hole have a second overlapping area;
wherein the light guide plate has a third dot structure formed corresponding to the fifth hole and the sixth hole and has the second dot structure formed corresponding to the fourth hole except the first overlapping area and the second overlapping area, and the third dot structure is larger than the first dot structure and less than the second dot structure in dot intensity.

4. The backlight keyboard of claim 3, wherein the first hole configuration further comprises a first central hole, the second hole configuration further comprises a second central hole, and the second keyswitch on the second backlight keyboard is shifted transversely relative to the first keyswitch on the backlight keyboard to make the second central hole and the first hole have a central overlapping area;
wherein the light guide plate has the second dot structure formed at least partially corresponding to the first central hole and the second central hole except the central overlapping area.

5. The backlight keyboard of claim 1, wherein the first hole configuration further comprises a fifth hole formed inward relative to the second hole, the second hole configuration further comprises a sixth hole formed inward relative to the fourth hole, the second keyswitch on the second backlight keyboard is shifted transversely relative to the first keyswitch on the backlight keyboard to make the fourth hole and the fifth hole have a second overlapping area and make the sixth hole and the second hole have a third overlapping area;
wherein the light guide plate has the second dot structure formed corresponding to the second hole and the fourth hole except the first overlapping area and the second overlapping area, and has a third dot structure formed at least partially corresponding to the fifth hole and the sixth hole except the third overlapping area, and the third dot structure is larger than the first dot structure and less than the second dot structure in dot intensity.

6. The backlight keyboard of claim 5, wherein the first hole configuration further comprises a first central hole, the second hole configuration further comprises a second central hole, and the second keyswitch on the second backlight keyboard is shifted transversely relative to the first keyswitch on the backlight keyboard to make the second central hole and the first hole have a central overlapping area;

wherein the light guide plate has the second dot structure formed at least partially corresponding to the first central hole and the second central hole except the central overlapping area.

7. The backlight keyboard of claim 1, wherein the first hole configuration further comprises a first central hole, the second hole configuration further comprises a second central hole, and the second keyswitch on the second backlight keyboard is shifted transversely relative to the first keyswitch on the backlight keyboard to make the second central hole and the first hole have a central overlapping area;

wherein the light guide plate has the second dot structure formed at least partially corresponding to the first central hole and the second central hole except the central overlapping area.

8. A backlight keyboard comprising:
- a first language keyswitch set comprising at least one first keyswitch;
- a first board disposed under the first language keyswitch set, the first board having a hole configuration corresponding to the first keyswitch, the hole configuration comprising at least one first hole, at least one second hole and at least one third hole, the first hole being opposite to the second hole, and the third hole being formed inward relative to the second hole;
- a first backlight source disposed under the first board for providing light; and
- a light guide plate applied to the backlight keyboard and a second backlight keyboard, the second backlight keyboard comprising a second language keyswitch set, a second board, and a second backlight source, the second language keyswitch set comprising at least one second keyswitch having the same size with the first keyswitch, the second board being disposed under the second language keyswitch set, the second board having the hole configuration corresponding to the second keyswitch, the second backlight source being disposed under the second board for providing light, the second keyswitch on the second backlight keyboard being shifted transversely relative to the first keyswitch on the backlight keyboard to make the second hole corresponding to the second keyswitch and the third hole corresponding to the first keyswitch have a first overlapping area and make the third hole corresponding to the second keyswitch and the second hole corresponding to the first keyswitch have a second overlapping area, the light guide plate being disposed under the first board or the second board, and the light guide plate having a first dot structure formed corresponding to the first hole, a second dot structure formed corresponding to the second hole, and a third dot structure formed at least partially corresponding to the third hole except the first overlapping area and the second overlapping area, for guiding light to symbols on the first keyswitch and the second keyswitch;

wherein the third dot structure is larger than the first dot structure and less than the second dot structure in dot intensity.

9. The backlight keyboard of claim 8, wherein the first language keyswitch set is a keyswitch set corresponding to United Kingdom language family or United States language family, and the second language keyswitch set is a keyswitch set corresponding to Japanese language family.

10. The backlight keyboard of claim 8, wherein the hole configuration further comprises a central hole, the second keyswitch on the second backlight keyboard is shifted transversely relative to the first keyswitch on the backlight keyboard to make the central hole corresponding to the second keyswitch and the first hole corresponding to the first keyswitch have a first central overlapping area and make the first hole corresponding to the second keyswitch and the central hole corresponding to the first keyswitch have a second central overlapping area;

wherein the light guide plate has the second dot structure formed thereon at least partially corresponding to the central holes except the first central overlapping area and the second central overlapping structure.

* * * * *